United States Patent [19]
Nakatani

[11] Patent Number: 5,746,407
[45] Date of Patent: May 5, 1998

[54] TRIPOD

[75] Inventor: Koichiro Nakatani, Tokyo, Japan

[73] Assignee: Nihon Velbon Seiki Kogyo Kabushiki Kaisha, Tokyo, Japan

[21] Appl. No.: 495,668

[22] PCT Filed: Mar. 2, 1995

[86] PCT No.: PCT/JP95/00333

§ 371 Date: Jul. 26, 1996

§ 102(e) Date: Jul. 26, 1996

[87] PCT Pub. No.: WO96/27100

PCT Pub. Date: Sep. 6, 1996

[51] Int. Cl.$^6$ .................................................. F16M 11/04
[52] U.S. Cl. ........................ 248/178.1; 248/168; 248/407
[58] Field of Search ........................... 248/178.1, 161, 248/188.2, 407, 412, 410, 621, 624, 632, 188.3, 188.4, 163.1, 163.2, 431, 166, 168, 159; 403/104

[56] References Cited

U.S. PATENT DOCUMENTS

| | | | |
|---|---|---|---|
| 3,051,425 | 8/1962 | Homrighausen | 248/168 |
| 4,627,602 | 12/1986 | Sporck | 248/188.2 |
| 4,706,916 | 11/1987 | Cullmann | 248/168 |
| 4,903,930 | 2/1990 | Jann | 248/188.2 |
| 5,531,413 | 7/1996 | Wolf | 248/188.2 |

FOREIGN PATENT DOCUMENTS

6034875  7/1982  Japan .
1103692  7/1986  Japan .

*Primary Examiner*—Ramon O. Ramirez
*Assistant Examiner*—Gwendolyn W. Baxter
*Attorney, Agent, or Firm*—Morrison Law Firm

[57] ABSTRACT

A tripod includes a vertically movable center column dividable into an upper column member and a lower column member. A lower flange on a lower end of the lower column member prevents the center column from slipping off the tripod when fully extended. When a user removes the lower column member for an activity such as low-angle photography, a number of stopper protrusions prevent the upper column member from slipping off the tripod. When the user reattaches the lower column member, the stopper protrusions disengage to permit free movement of the center column. The present invention thus allows low-angle photography, provides a wide range of vertical motion of the center column, and prevents the user from accidentally damaging a camera when the lower column member is removed.

14 Claims, 8 Drawing Sheets

TRIPOD

TECHNICAL FIELD

This invention relates to a tripod which is provided with a center column for vertical movement and is suitable for taking a picture from a low angle.

BACKGROUND ART

An example of tripods of this type has such a configuration that the center column, on which a camera is mounted, is moved up and down by turning a gear engaged with rack teeth and that the height of the camera for taking a picture, in other words the angle of its view, is adjusted by adjusting the height of the center column.

According to a typical configuration of a conventional tripod of this type, a key way is formed in the center column so that the center column is capable of moving straight up or down with respect to the main body, and the main body, which has this vertically movable center column, is provided with a key to be caught in said key way. Further, a flange which is capable of catching the key of the main body is provided at each end of the center column, i.e. at the top and the bottom thereof, thus restraining the vertical movement of the center column and preventing it from slipping off of the main body during its vertical movement.

In case of a tripod having the configuration as above, setting a large range for the vertical movement of the center column presents a problem in taking picture from a low angle, with the camera set at a lower position; when the legs attached to the main body are spread to set the camera at a lower position or when the center column is lowered with the legs thus spread, a long portion of the center column projects downward from the main body and abuts against the ground, thus preventing the camera to be moved to a lower position.

As an example of a means offered for solving this problem is a configuration which calls for dividing the center column into two parts: the upper column member and the lower column member which are joined together in the normal circumstances, and removing the lower column member when taking a picture from a low angle, thereby reducing the length which the center column projects downward from the main body so that the camera can be set at a lower position.

In this configuration of the center column divided into two parts, wherein rack teeth are formed on the center column along its axial direction, it is necessary to adjust the positions of the upper and lower column members so as not to cause the upper and lower rack teeth to get out of alignment in the circumferential direction when joining the upper column member and the lower column member. For this purpose, one of the rack members may be provided with a joint to catch the connecting end of the other rack member, while the other rack member may be provided with a positioning pin to be caught in a catching groove which is formed in the aforementioned joint, in the axial direction of the joint.

However, as such a configuration as above has to provide a positioning pin projecting from a column member, the number of parts is increased, complicating the assembly work as well as making it more difficult to handle.

Furthermore, when the lower column member is separated from the upper column member, the upper column member may accidentally slip off of the main body, because the upper column member is not provided with a flange at its bottom to restrict its upward movement. In this regard, the above configuration presents other problems in that there is the danger of a camera, a camera platform and the like which are mounted on the upper column member falling off and being damaged and that such a tripod is inconvenient to handle because it is difficult to reattach the center column which has fallen off.

In order to solve the above problems, an object of the invention is to provide a tripod suitable for taking pictures from a low angle, said tripod having a vertically movable center column divided into two parts which are capable of being connected to each other and easy to handle.

DISCLOSURE OF INVENTION

An apparatus according to the invention is provided with a main body to which three leg rods are pivotably attached; a center column which is so attached to the main body as to be capable of moving vertically and is provided with rack teeth and a fixture portion, the rack teeth being formed along the axial direction of the center column and the fixture portion provided on the upper end of the center column; and a gear revolvably attached to the main body so that its interlocking revolution with the rack teeth of the center column vertically moves the center column; wherein the center column is provided with an upper column member and a lower column member which are both in the shape of a hollow tube and separably joined at about the midpoint along the axial direction of the center column; a joint for, adjusting positions of the upper and lower column members with respect to the circumferential direction, said joint to be provided at one of the column members and fitted to the connecting end of the other column member and having such a shape as to correspond to the irregular shape formed on the inner surface of the connecting portion of the latter column member, to which the joint is to be connected; a nut provided inside the upper column member; and a screw rod to be inserted through the lower end of the lower column member and screwed in the nut, thereby affixing the upper and lower column members together. With the configuration as above, when used in normal circumstances, the main body is set at an appropriate height by three leg rods; a camera is mounted on a camera platform attached to the fixture portion at the upper end of the center column which is so attached to the main body as to be capable of moving up and down; the gear attached to the main body is revolved so that the center column is raised or lowered through engagement of the gear with the rack teeth of the center column, thereby setting the camera at a height for a suitable photographic angle. When taking pictures from a low angle, by turning the screw rod to unscrew it off the nut and removing the lower column member from the upper column member, the camera can be set at a sufficiently low position, because the length by which the upper column member projects downward when lowered is reduced. When connecting the lower column member to the upper column member, by fitting the joint of one of the two column members onto the connecting end of the other column member, of which the inner surface of the portion around the connecting end is formed into an irregular shape, the joint of the former column member being formed into such a shape as to correspond to the irregular shape of the inner surface of the connecting end of the latter column member, both column members can be so positioned as to be aligned with respect to the axial direction so that the rack teeth of both column members are aligned in a straight line. Thus, the present invention offers a center column which can be divided into two parts and is suitable for taking pictures from a low angle, said center column having an easy-to-assemble configuration, does not require special parts to achieve alignment nor a large number of parts, is capable of being positioned using less material, wherein the irregular shape of a column member can be formed by catching concavities and the like.

An apparatus according to another feature of the invention is provided with a plurality of collet pieces projecting from both ends of a joint which is provided at the lower column member, the tip of each collet piece being formed into a tapered surface; tapered collet catching portions formed on the outer surface of a nut provided inside the upper column member, the tapered collet catching portions being capable of coming to taper engagement with the tapered surface at an end of the corresponding collet piece projecting from the upper end of the lower column member when the lower column member is connected to the upper column member and capable of being disengaged therefrom; a collet provided inside the lower column member in such a manner that the collet is capable of moving along the axial direction; and tapered collet catching portions formed on the outer surface of the collet, the tapered collet catching portions to come to taper engagement with the collet pieces projecting from the other end of the joint in the state where the screw rod is screwed in the nut. With the configuration as above, when the upper column member and lower column member are connected to each other, the tapered collet catching portions of the nut are caught with the tapered surfaces of the collet pieces at one end of the joint, and in the state where the screw rod is screwed in the nut, the tapered collet catching portions on the outer surface of the collet which is provided inside the lower column member are in engagement with the collet pieces projecting from the other end of the joint. Therefore, the upper column member and lower column member can be snugly connected without rattling and smoothly raised or lowered through engagement of their rack teeth with the gear.

An apparatus according to yet another feature of the invention is provided with a main body to which three leg rods are pivotably attached; a center column which is so attached to the main body as to be capable of vertically moving and is provided with rack teeth and a fixture portion, the rack teeth being formed along the axial direction of the center column, and the fixture portion provided on the upper end of the center column; and a gear revolvably attached to the main body so that its interlocking revolution with the rack teeth of the center column vertically moves the center column; wherein the center column is provided with an upper column member and a lower column member which are both in the shape of a hollow tube and separably joined at about the midpoint along the axial direction of the center column; key ways for catching keys formed on the main body, the key ways being formed in the outer surfaces of these upper and lower column members, along the axial direction thereof; through holes formed in these key ways; stopper protrusions provided inside the upper column member in such a manner as to project from said through holes; a stopper having elastic stick portions which have elastic force and are capable of forcing the stopper protrusions to retreat from the key ways; a nut which is provided in said upper column member in such a manner as to be capable of sliding therein along the axial direction and coming in contact with and detached from said elastic stick portions of the stopper, the nut having a catching portion which catches and pushes the elastic stick portions to resist their elastic force, thereby forcing the stopper protrusions to project outward from the through holes when the upper column member and lower column member are separated, and causes the stopper protrusions to retreat from the through holes when the upper and lower column members are coupled; a spring which is provided in the upper column member and constantly pushes the nut in such a direction that the catching portion of the nut catches the elastic stick portions; and a screw rod which is inserted through the lower end of the lower column member into the aforementioned nut provided in the upper column member, pulls the nut to resist the force of said spring in such a direction that its catching portion moves away from the elastic stick portions of the stopper and securely couples the upper and lower column members together. With the configuration as above, when the lower column member is removed from the upper column member in order to take pictures from a low angle or for any other purposes, the nut, being pushed by the spring, slides so that its catching portion pushes the elastic stick portions of the stopper, resisting the elastic force of the elastic stick portions, thereby causing the stopper protrusions to project outward from the through holes formed in the key ways of the upper column member. Therefore, as the stopper protrusions are caught by the keys of the main body and prevented from moving upward, there is no danger of the upper column member accidentally slipping off of the main body nor the camera or other equipment falling and being damaged, nor having to do the otherwise required trouble of putting back the center column which has slipped off. Further, when the screw rod is screwed into the nut to connect the lower column member to the upper column member, the nut is pulled resisting the force of the spring, and when the lower column member is connected to the upper column member, the catching portion becomes detached from the elastic sticks of the stopper, causing the elastic sticks to return to the initial position due to their elastic force and the stopper protrusions to retreat from the key ways so that the lower column member of the center column can be vertically moved without catching the keys formed on the main body. Thus, the present invention is effective in improving handling of a center column which is divided into two parts and is suitable for taking pictures from a low angle.

An apparatus according to yet another feature of the invention is provided with a center column which is so attached to a main body as to be capable of moving up and down and is provided with rack teeth and a fixture portion, the main body being provided with keys and three leg rods which are pivotably attached thereto, said rack teeth being formed along the axial direction of the center column, and the fixture portion provided on the upper end of the center column; and a gear revolvably attached to the main body so that its interlocking revolution with the rack teeth of the center column vertically moves the center column; wherein the center column is provided with an upper column member and a lower column member which are both in the shape of a hollow tube and separably joined at about the midpoint along the axial direction of the center column; key ways for catching keys formed on the main body, the key ways being formed in the outer surfaces of these upper and lower column members, along the axial direction thereof and having through holes formed therein; stoppers pivotably disposed inside the upper column member and having stopper protrusions and operated portions to which the operating force is applied, said stopper protrusions projecting from the through holes; a stopper operator which is so provided inside upper column member as to be capable of moving along the axial length while constantly being exposed to the force of a spring and has cum surfaces to become engaged with the operated portions of the stoppers, the stopper operator causing the stopper protrusions to project outward from the through holes when the upper and lower column members are separated, and also causing said stopper protrusion to retreat the through holes when the upper and lower column members are coupled; a nut which is connected to the aforementioned stoppers and provided inside the upper column member in such a manner as to be able to slide along the axial direction; and a screw rod which is inserted through the lower end of the lower column member into the aforementioned nut, which is provided in the upper column member, the screw rod being capable of causing the nut to be caught by the cam surfaces of the stopper operator so that the stopper protrusions of the stoppers retreat from the through holes to resist the force of the spring and that the upper and lower column members are affixed together. With the configuration as above, when the lower column member is removed from the upper column member in order to take pictures from a low angle or for other purposes, the stopper operator connected to the nut slides, being pushed by the spring, so that its cam surfaces catch the catching portions of stoppers and pivot the stoppers, thereby causing the stopper protrusions to project outward from the through holes formed in the key ways of the upper column member. Therefore, as the stopper protrusions are caught by the keys of the main body and prevented from moving upward, there is no danger of the upper column member accidentally slipping off of the main body nor the camera or other equipment falling and being damaged, nor having to cope with troublesome task of putting back the center column which has slipped off. Further, when the screw rod is screwed into the nut to connect the lower column member to the upper column member, the stopper operator connected to the nut is pulled to resist the force of the spring, and when the lower column member is connected to the upper column member, the cam portions pivot the stoppers so that stopper protrusions retreat from the key ways and that the lower column member of the center column can be moved up or down without catching the keys formed on the main body, with the cam surfaces pivoting the stoppers. Thus, the present invention ensures reliable functioning of the apparatus and is effective in improving durability and handling of a center column which is divided into two parts and is suitable for taking pictures from a low angle.

An apparatus according to yet another feature of the invention is provided with a center column which is so attached to a main body as to be capable of moving up and down and is provided with rack teeth and a fixture portion, the main body being provided with keys and three leg rods which are pivotably attached thereto, said rack teeth being formed along the axial direction of the center column, and the fixture portion provided on the upper end of the center column; and a gear revolvably attached to the main body so that its interlocking revolution with the rack teeth of the center column vertically moves the center column; wherein the center column is provided with an upper column member and a lower column member which are both in the shape of a hollow tube and separably joined at about the midpoint along the axial direction of the center column; a plurality of collet pieces projecting from the lower column member, both ends of each collet piece being formed into tapered surfaces; a nut provided in the upper column member; tapered collet catching portions which are formed on the outer surface of the nut, each collet catching portion being capable of coming to taper engagement with the tapered surface at an end of the corresponding collet piece projecting from the upper end of the lower column member when the lower column member is connected to the upper column member and capable of being disengaged therefrom; a screw rod which is inserted from the lower end of the lower column member into a nut provided inside the upper column member and screwed in the nut, thereby affixing the upper and lower column members together; a collet provided inside the lower column member in such a manner as to be capable of moving along the axial direction; and tapered collet catching portions formed on the outer surface of the collet, the tapered collet catching portions to come to taper engagement with the tapered surfaces of the collet pieces when the screw rod inserted through the lower end of the lower column member is screwed in the nut. With the configuration as above, when the upper column member and lower column member are connected to each other, the tapered surfaces formed at one of the two ends of the respective collet pieces are engaged with tapered catching portions of the nut, and in the state where the screw rod is screwed in the nut, the tapered collet catching portions on the outer surface of the collet, which is provided inside the lower column member, are in engagement with the tapered surfaces projecting from the other ends of the collet pieces. Therefore, the collet pieces are free from the danger of deformation, and the upper column member and lower column member can be snugly connected without rattling and smoothly raised or lowered through engagement of their rack teeth with the gear.

BEST MODE FOR CARRYING OUT THE INVENTION

Next, a tripod according to an embodiment of the present invention is explained hereunder, referring to the drawings.

Figure 4:
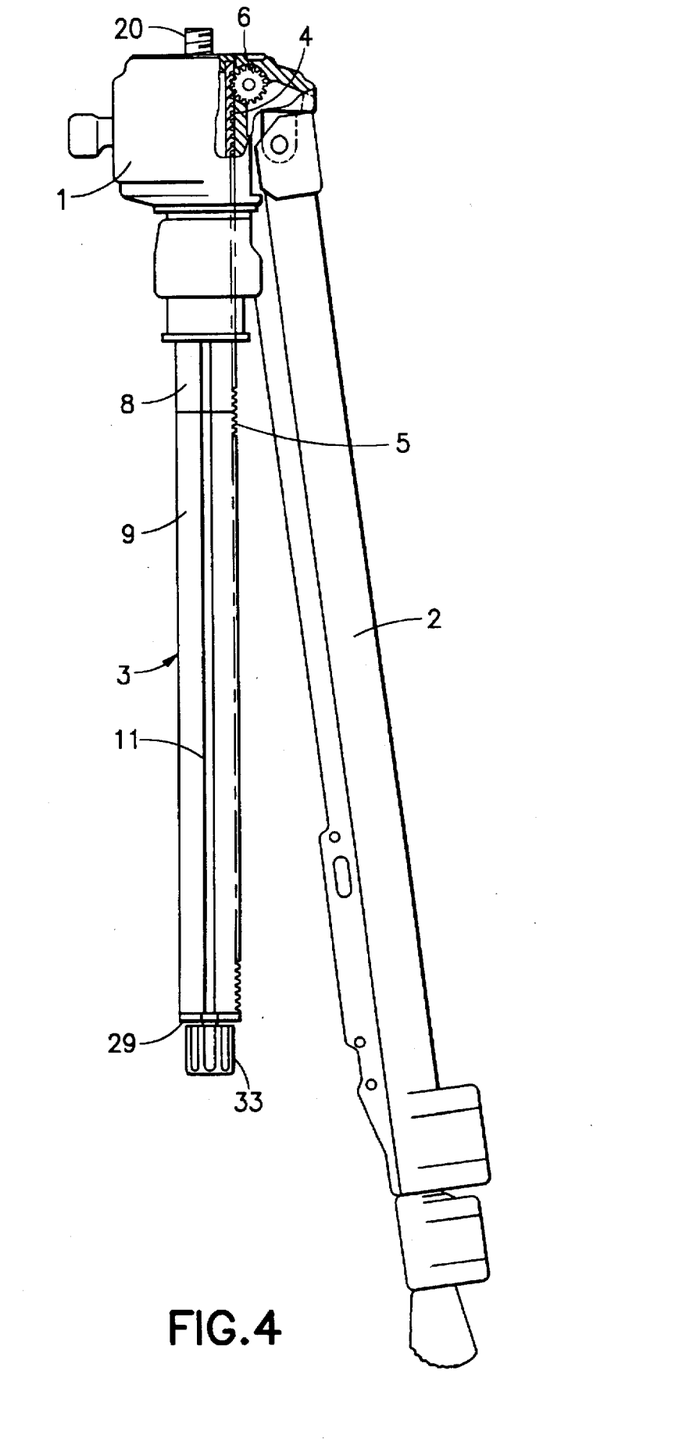
FIG. 4 is a partially cut out front view of said tripod.
Figure 5:
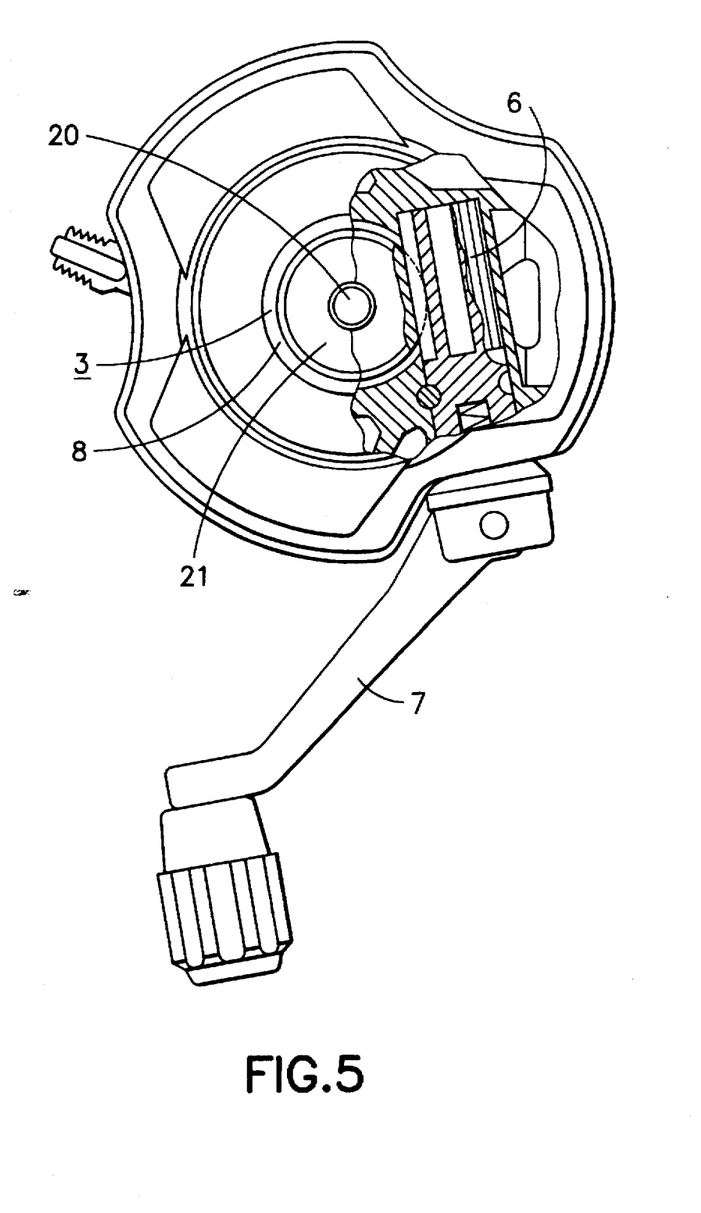
FIG. 5 is a partially cut out top view of said tripod.

FIGS. 4 and 5 respectively represent a partially cut out front view and a partially cut out top view of a tripod, wherein numeral 1 denotes a main body, to which the respective upper ends of the three leg rods 2 are attached so that leg rods 2 are free to pivot around main body 1. An elevator hole is vertically bored through main body 1, with center column 3 being inserted through elevation hole 4 in such a manner as to be freely movable through elevation hole 4. Disposed at a side of center column 3 is a gear 6 which is supported by a shaft so as to be able to turn and engage with rack teeth 5 formed in the outer surface of center column 3 in its axial direction. Gear 6 is rotated by a handle 7 attached thereto, and as a result of rotation of gear 6, center column 3 is moved up and down.

Figure 1:
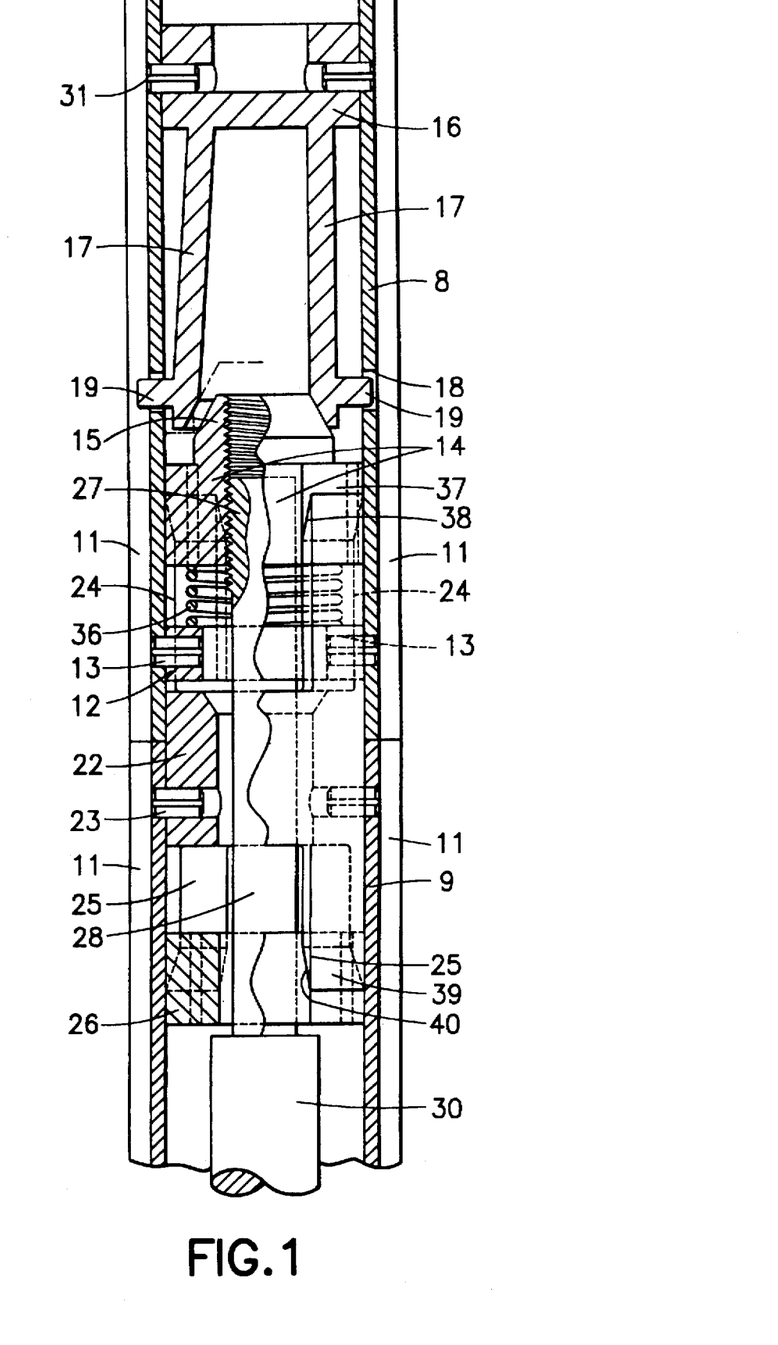
Fig. 1 is a sectional view of a part of the center column of a tripod according to an embodiment of the present invention.
Figure 2:
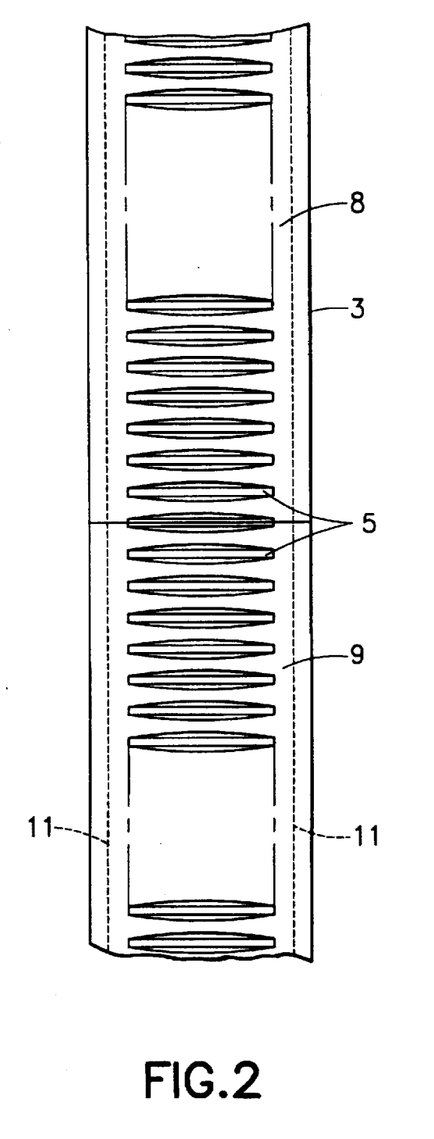
FIG. 2 is a front view of a part of said center column.
Figure 3:
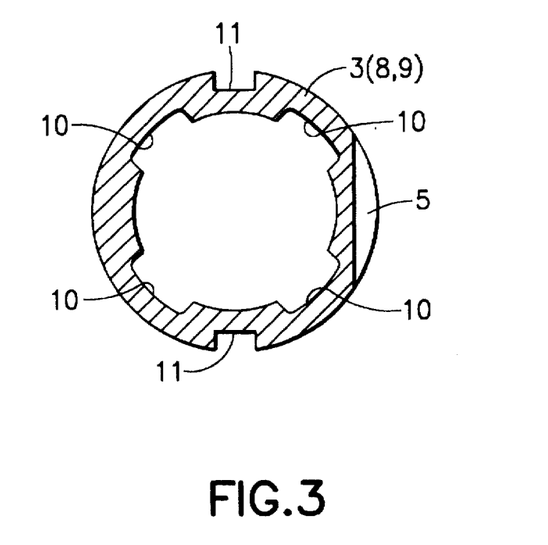
FIG. 3 is a sectional view of said center column.

FIG. 1 is a sectional view of a part of the center column; FIG. 2 is a front view of a part of the center column; and FIG. 3 is a sectional view of the center column. As shown in FIGS. 1 to 3, center column 3 consists of an upper column member 8 and a lower column member 9 which are both in the shape of a hollow tube formed by means of extrusion molding or drawing and separably joined at about the midpoint along the axial direction of the center column. Lower column member 9 may be longer than upper column member 8. As shown in FIG. 3, the respective inner surfaces of upper column member 8 and lower column member 9 have an irregular shape having a plurality of catching concavities (for example four concavities) 10 which extend in the axial direction are formed in the inner surfaces of the column members, the concavities being arranged along the inner circumference at approximately regular intervals. Rack teeth 5 are formed on the outer surface of upper column member 8 and lower column member 9 in such a manner that rack teeth 5 are aligned in a continuous line extending in the axial direction when upper column member 8 and lower column member 9 are coupled.

As shown in FIG. 1, upper column member 8 and lower column member 9 are also provided in their respective outer surface with a pair of key ways 11 which extend in the axial direction along both sides of rack teeth 5 in such a manner that each key way 11 form a continuous line when upper column member 8 and lower column member 9 are coupled and is capable of catching a key (not shown) which is formed at elevation hole 4 of main body 1.

Located near the connecting end of upper column member 8 is a spring bearing 12 which is fitted inside upper column member 8 and affixed by pins or screws 13.

Also provided inside upper column member 8 is a nut 14 which is located above spring bearing 12 and is free to slide in the axial direction. The top of nut 14 is formed into a catching portion 15 having a shape of a truncated cone narrowing upward. A coil spring 36 for pushing nut 14 upward is set between nut 14 and spring bearing 12. Formed on the outer surface of nut 14 are tapered collet catching portions 37 which become thicker from the lower end to the upper end and formed at four locations, at intervals in the circumferential direction, said four locations respectively corresponding to catching concavities 10 of upper column member 8. A stopper 16 is affixed to the inside of upper column member 8 by pins or screws 31. A stopper 16 is provided with a pair of elastic stick portions 17 which project downward from the left and right areas of the underside of stopper 16 and have inward elastic force, in the direction towards each other. Provided at the lower end of each elastic stick 17 is a stopper protrusion 19 which is capable of projecting through and coming out of a through hole 18 bored in each key way 11. With the configuration as above, when catching portion 15 of nut 14 moves upward and comes to contact with elastic sticks 17, elastic sticks 17 are pushed outward to resist their elastic force so that stopper protrusions 19 project through respective through holes 19 into key ways 11. When catching portion 15 of nut 14 moves down, thereby releasing elastic sticks 17 from their contact with nut 14, elastic sticks 17 move inward due to their elastic force so that stopper protrusions 19 retreat from through holes 18.

Further, as shown in FIG. 4 and 5, a fixture portion 20 consisting of a threaded member affixed to the top of upper column member 8 projects from a flange 21 which is mounted on the top of upper column member 8.

Fitted to lower column member 9 is a joint 22 which is formed by extrusion molding, drawing or die casting and to be fitted to the connecting end of upper column member 8 where it is connected to lower column member 9. Said joint 22 is affixed to lower column member 9 with pins or screws 23 and is provided with a plurality of collet pieces (for example four pieces) 24 projecting therefrom and being capable of fitting in respective catching concavities 10 at the connecting end of upper column member 8. The edge of each collet piece 24 is formed into a tapered surface 38 to engage with corresponding collet catching portion 37 of nut 14.

Inside lower column member 9, joint 22 is also provided with collet pieces 25 which project downward from the lower end of joint 22 and located at positions respectively corresponding to catching concavities 10 formed in the inner surface of lower column member 9. A collet 26 is fitted to lower column member 9 in such a manner that collet 26 is able to move along the axial direction of the column member, collet 26 having collet catching portions 39 which are formed on the outer surface of the collet, at positions respectively corresponding to catching concavities 10 of lower column member 9, and capable of respectively catching tapered surfaces 40 of collet pieces 25 in taper engagement.

A screw rod 28 having a threaded portion 27 at its tip is inserted through a through hole of a flange 29 which is provided at the bottom of lower column member 9, threaded portion 27 of screw rod 28 to be screwed in nut 14 provided inside upper column member 8. A thick portion 30 for catching collet 26 and moving it upward is formed about the middle of screw rod 28. Screw rod 28 is constantly exposed to the force pushing it upward by a coil spring (not shown) which is coiled around the portion of screw rod 28 between thick portion 30 and flange 29. Further, a knob 33 is attached to the lower end of screw rod 28.

Next, the operation of this embodiment is explained hereunder.

When used in normal circumstances, main body 1 is set at an appropriate position by three leg rods 2. Then, with a camera platform or the like in between, a camera is mounted on fixture portion 20 at the top of center column 3 which is so attached to main body 1 as to be capable of moving up and down through elevation hole 4; and rotate gear 6 of main body 1 by means of handle 7 to vertically move center column 3 through engagement of gear 6 with rack teeth 5 of center column 3 so that the camera is set at the most suitable height to take pictures.

When taking pictures from a low angle, turn screw rod 28 with knob 33 to unscrew it off nut 14 and remove lower column member 9 from upper column member 8. When upper column member 8 is lowered in this state, as the length by which upper column member 8 projects down is short, it is possible to set the camera sufficiently low. When lower column member 9 is removed from upper column member 8, screw rod 28 is already released from engagement with nut 14. Therefore, nut 14, being pushed by spring 36, slides upward so that its catching portion 15 comes to contact with elastic sticks 17 of stopper 16 and push elastic sticks 17 to resist their elastic force, thereby causing stopper protrusions 19 to protrude out of respective through holes 18 formed in key ways 11 of upper column member 8. When upper column member 8 is moved upward in this state, stopper protrusions 19 are caught by the keys of main body 1, thereby restraining the upward movement of upper column member 8 and preventing it from accidentally slipping off of main body 1.

When connecting lower column member 9 to upper column member 8, fit collet pieces 24 of joint 22 of lower column member 9 onto the connecting end of upper column member 8, with their circumferential positions being set by engaging collet pieces 24 in catching concavities 10 of upper column member 8. In this state, as tapered surface 38 of each collet piece 24 is caught by collet catching portion 37 of nut 14 in taper engagement, upper column member 8 being connected to lower column member 9 with their positions being aligned with respect to the axial direction, rack teeth 5 of upper column member 8 are aligned with those of lower column member 9 in a straight line.

Then, insert screw rod 28 through lower column member 9 from its lower end, and securely connect lower column member 9 to upper column member 8 by screwing the screw rod into nut 14 which is provided inside upper column member 8. At that time, upper column member 8 and lower column member 9 are snugly connected without the danger of rattling, because collet catching portions 39 of collet 26 that has been pushed up by thick portion 30 of screw rod 28 catch tapered surface 40 of respective collet pieces 25 provided at the bottom of joint 22. Further, as screw rod 28 is biased by a spring which is not shown in the drawings, it can be easily screwed into nut 14.

When screw rod 28 is screwed into nut 14 provided inside upper column member 8 by connecting lower column member 9 to upper column member 8, nut 14 approaches screw rod 28 to resist the force of spring 36 and slides downward in the axial direction to resist spring 36. As a result, its catching portion 15 becomes detached from elastic sticks 17 of stopper 16 so that the elastic force of elastic sticks 17 returns them to the initial position, with stopper protrusions 19 retreating from key ways 11, and that lower column member 9 of center column 3 is moved in the vertical direction without catching the keys of main body 1. As movement of center column 3 is restrained by flange 29 engaged with the keys at the raised position of center column 3 and flange 21 engaged with the keys at the lowered position of center column 3, center column 3 is prevented from slipping off of main body 1.

Although joint 22 is provided at lower column member 9 of center column 3 according to the configuration of the above embodiment, joint 22 may be provided at upper column member 8 so as to be fitted to the connecting end of lower column member 9.

Furthermore, upper column member 8 and lower column member 9 have an irregular inner surface with a plurality of catching concavities being arranged at approximately regular intervals and formed along the total length of each column member, which irregular shape can be easily formed by extrusion molding or drawing, such an irregular shape may be formed only at the connecting end of each column member.

Figures 6, 7:
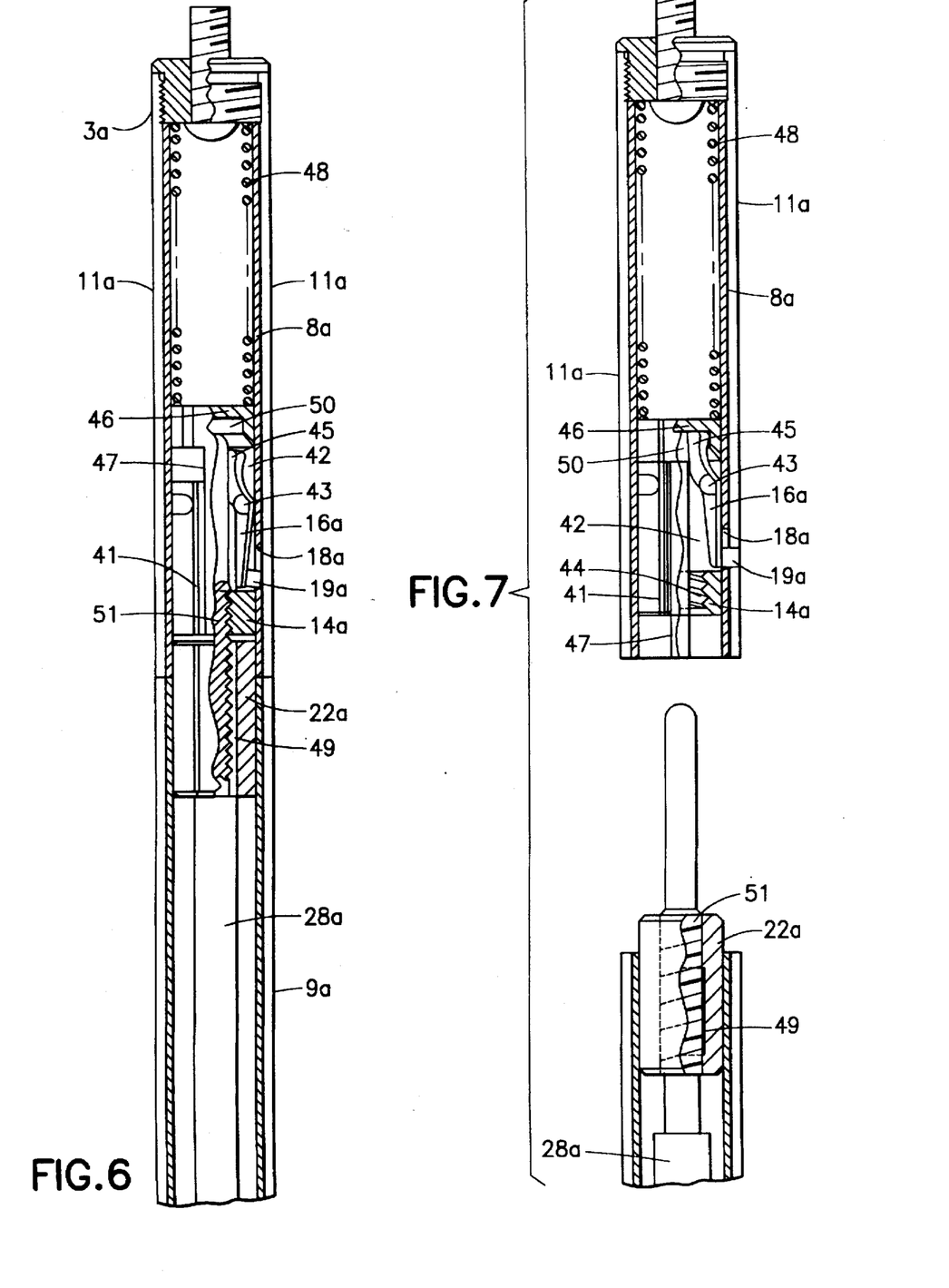
FIG. 6 is a sectional view of a part of the center column of a tripod according to another embodiment of the present invention.
FIG. 7 is a sectional view of the center column of said tripod in their separated state.

Next, another embodiment of the invention is explained hereunder, referring to FIGS. 6 and 7.

A nut 14a is fitted in an upper column member 8a, at a position near the lower end of upper column member 8a, and is fastened with pins or screws which are not shown in the drawings. Nut 14a is provided on its outer surface with vertically extending grooves 41, which are formed one each on both sides of nut 14a. Also formed around nut 14a is an indented portion 42, in which stoppers 16a are caught in such a manner that stoppers 16a are capable of pivoting around respective shaft portions 43. Provided at the lower part of each stopper 16a are stopper protrusions 19a which respectively project out of through holes 18a into key ways 11a of upper column member 8a. Further, the upper portion of each stopper 16a is formed into an operated portion 45 which is located above threaded center hole 44 of nut 14a.

Figure 8:
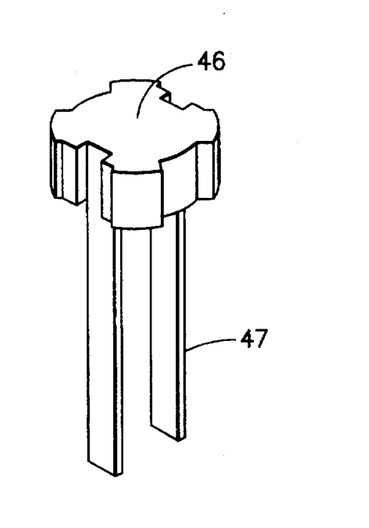
FIG. 8 is an oblique view of an operator.

A stopper operator 46 is fitted in upper column member 8a, at a position above nut 14a, so as to be capable of moving in the axial direction of the column member. As shown in FIG. 8, a pair of operating sticks 47 are formed as an integral part of operator 46 and project downward from the left and right areas of the underside of operator 46 in such a manner that operating sticks 47 are capable of advancing into and retreating from grooves 41 of nut 14a. Also formed in the underside of stopper operator 46 is a cam concavity 50 to permit operated portions 45 of stoppers 16a to be caught therein. Further, operator 46 is constantly pushed downward by a spring 48.

A joint 22a having a through hole 49 at the center is fitted and affixed to lower column member 9a, with the upper end of joint 22a projecting from an aperture at the top of lower column member 9a.

A screw rod 28a is inserted into lower column member 9a so as to be capable of moving in the axial direction and constantly pushed downward by a spring which is not shown in the drawings. The tip of screw rod 28a is inserted through the aforementioned through hole 49 of joint 22a and projected from the aperture which is provided at the top of lower column member 9a. The portion of screw rod 28a below its tip is formed into a threaded portion 51 to be screwed in threaded hole 44 of nut 14a.

The other part of this embodiment has the same configuration as the first embodiment described above.

Next, the operation of this embodiment is explained.

When connecting lower column member 9a to upper column member 8a, insert screw rod 28a from the bottom aperture of upper column member 8a into threaded hole 44 of nut 14a so that joint 22a fits in the bottom aperture of upper column member 8a and pushes operating sticks 47 of operator 46, thereby raising operator 46 to resist the force of spring 48. As a result of the rise of operator 46, cam concavity 50 becomes detached from operated portions 45 of stoppers 16a and permits screw rod 28a to rotate and be screwed in nut 14a. Thus, upper column member 8a and lower column member 9a are joined together, with the tip of screw rod 28a being inserted into the space between the back sides of stoppers 16a, and stopper protrusion 19a of each stopper 16a retreating from key way 11a.

When separating upper column member 8a and lower column member 9a, rotate screw rod 28a to unscrew its threaded portion 51 from threaded hole 44 and pull out lower column member 9a so that joint 22a and operating sticks 47 of operator 46 are detached from each other. As a result, operator 46 is lowered by spring 48, with cam concavity 50 catching operated portions 45, and stoppers 16a pivot, with stopper protrusions 19a of stoppers 16a projecting into key ways 11a.

Figure 9:
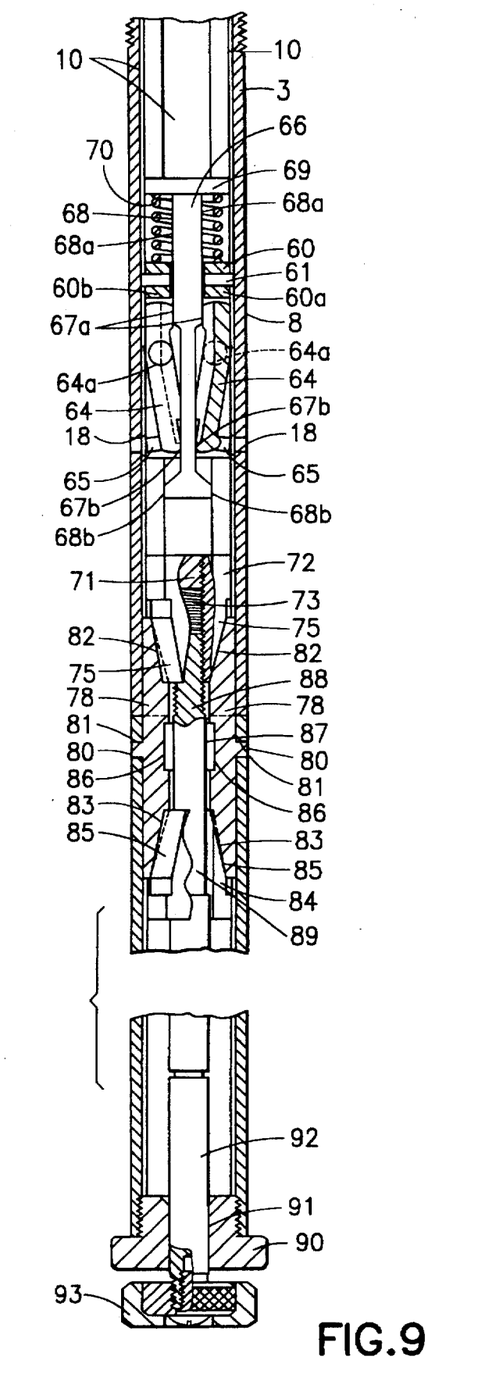
FIG. 9 is a sectional view of the center column of a tripod according to yet another embodiment of the present invention.
Figure 10:
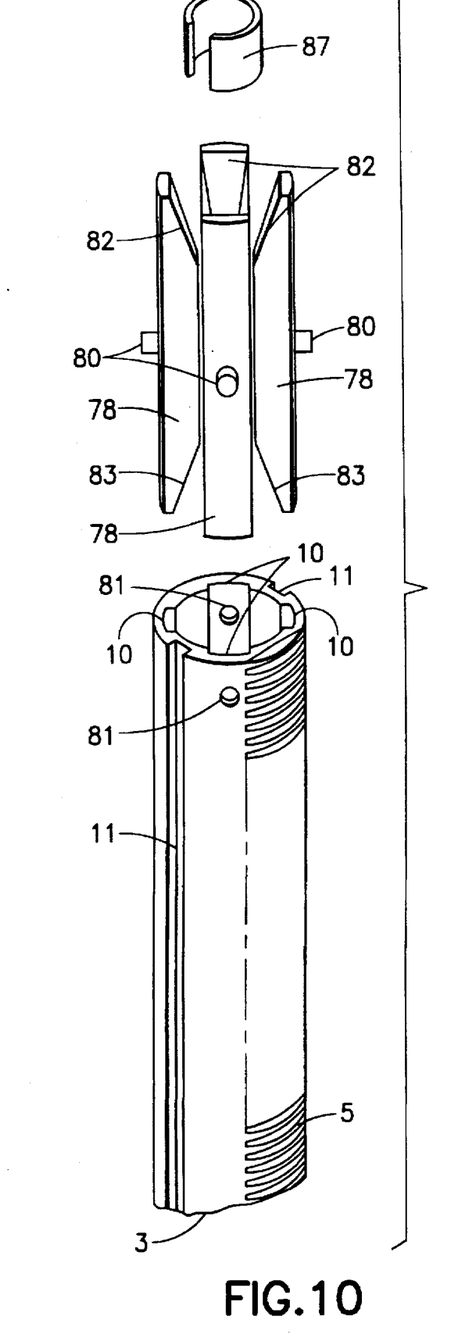
FIG. 10 is an exploded oblique view of a part of the upper and lower center column members of same.
Figure 11:
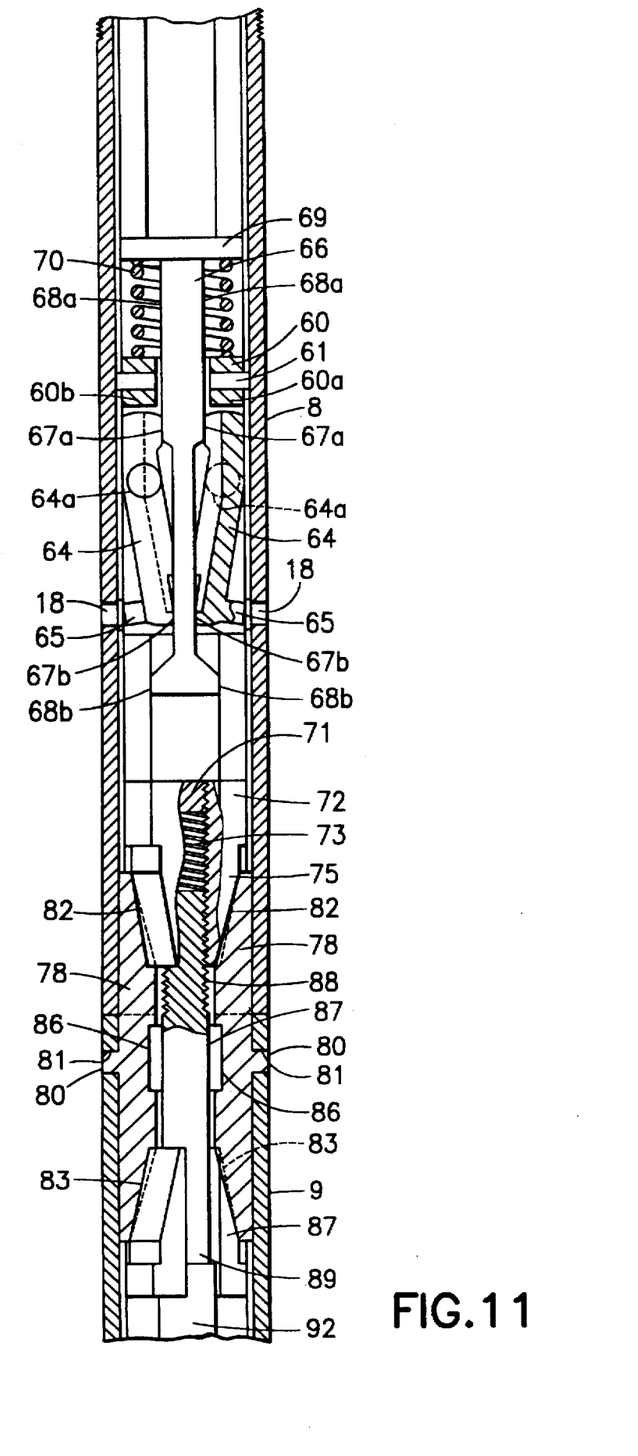
FIG. 11 is an enlarged sectional view of said center column in its connected state.
Figure 12:
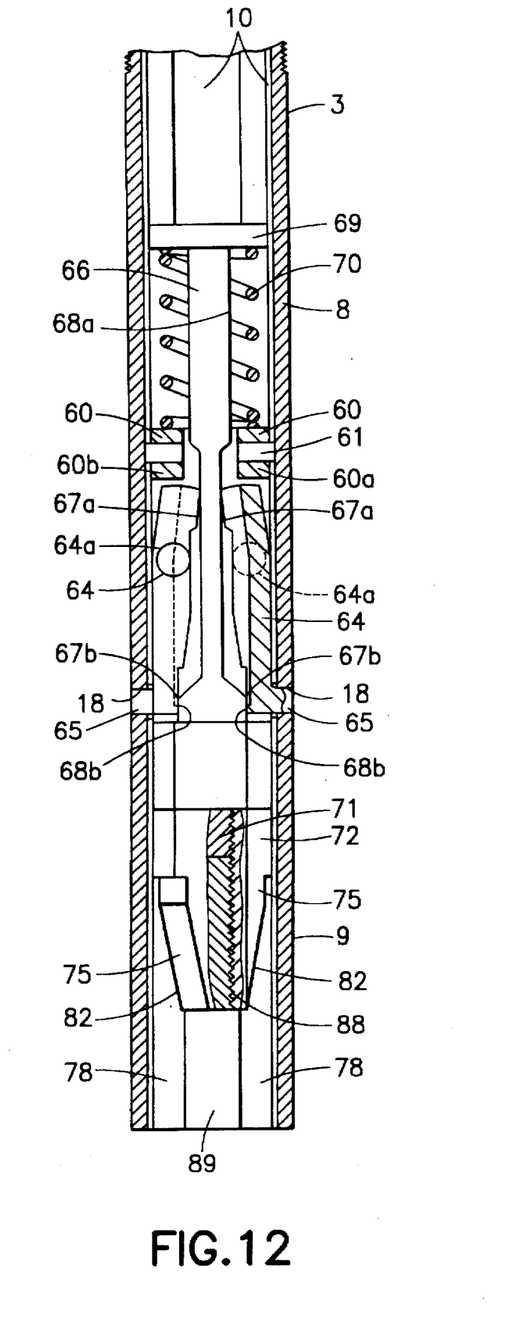
FIG. 12 is an enlarged sectional view of said center column in its divided state.

Next, the configuration of yet another embodiment of the invention is explained hereunder, referring to FIGS. 9 and 10.

FIGS. 9 and 10 respectively represent a sectional view of the center column and an oblique view of the lower column member of a tripod having such a configuration that center column 3, which is, as shown in FIG. 1, so inserted into main body 1 as to be capable of advancing and retreating, is moved up or down by operating handle 7. Center column 3 is formed by means of extrusion molding or drawing into such a shape as shown in FIG. 10, which is a hollow tube having a plurality of catching concavities (for example four concavities) 10 formed in its inner surface, catching concavities 10 extending in the axial direction and arranged in the circumferential direction at approximately regular intervals. Center column 3 can be divided at about the midpoint along the axial direction into an upper column member 8 and lower column member 9 which can be separated and reconnected. Rack teeth 5 are formed on the outer surface of upper column member 8 and lower column member 9 in such a manner that rack teeth 5 are aligned in a continuous line extending in the axial direction when upper column member 8 and lower column member 9 are joined. Upper column member 8 and lower column member 9 are also provided in their respective outer surface with a pair of key ways 11 which extend in the axial direction along both sides of rack teeth 5 in such a manner that key ways 11 on each side of both column members form a continuous line when upper column member 8 and lower column member 9 are coupled and are capable of catching keys (not shown) which are formed at elevation hole 4 of main body 1.

Fitted onto upper column member 8 is a spring bearing 60 which consists of a pair of spring bearing members 60a and 60b respectively affixed to upper column member 8 by pins or screws 61. Each spring bearing member 60a/60b is provided on its underside with fitting pieces 63 which project downward from opposing positions of the underside of each spring bearing member 60a/60b. A stopper 64 is fitted between fitting pieces 63 of each spring bearing member 60a/60b, the lower parts of stoppers 64/64 being curved towards each other. Shaft portions 64a which are provided about the middle of both sides of each stopper 64 and project therefrom are pivotably caught in cutout catching portions (not shown) formed in fitting pieces 63 of each spring bearing member 60a/60b. Stoppers 64/64 are provided on the outer surface of their lower parts with stopper protrusions 65/65 to project through and retreat from respective through holes 18, which are bored in key ways 11 of upper column member 8.

A stopper operator 66 is so disposed inside upper column member 8, between said pair of spring bearing members 60a/60b, as to be movable along the axial direction of upper column member 8. Both opposing sides of stopper operator 66 are formed into cum surfaces 68 which permit operated surfaces 67a formed on each inner surface of the pair of spring bearing member 60a/60b that face each other, operated surfaces 67a/67b on each inner side of spring bearing member 60a/60b being located at some distance from each other with respect to the axial direction. More precisely, the upper portions and the lower portions of cam surfaces 68 are respectively formed into raised cam portions 68a/68b, raised cam portions 68a being capable of catching operated surfaces 67a of stoppers 64/64 and causing stoppers 64/64 to pivot around shaft portions 64a, thereby causing stopper protrusions 65 of stoppers 64/64 to retreat from through holes 18 of upper column member 8, and raised cam portions 68b being capable of catching operated surfaces 67b of stoppers 64/64 and causing stoppers 64/64 to pivot around shaft portions 64a, in the opposite direction of the above, thereby causing stopper protrusions 65 of stoppers 64/64 to protrude out of through holes 18 of upper column member 8.

A spring bearing portion 69 is formed at the upper end of stopper operator 66, and a coil spring 70 fitted around stopper operator 66 has its both ends respectively caught by spring bearing portion 69 and spring bearing members 60a/60b, spring 70 thus constantly pushing stopper operator 66 upward.

Formed at the bottom of stopper operator 66 is a screw rod portion 71, which is screwed in a threaded hole 73 formed in a nut 72, threaded hole 73 extending in the axial direction. Nut 72 is so fitted in upper column member 8 as to be capable of sliding in the axial direction and provided around the outer surface of its lower end with tapered collet catching portions 75 which become thicker from bottom to top and are formed at four locations aligned in the circumferential direction at intervals, said four locations respectively corresponding to catching concavities 10 of upper column member 8.

Projecting into lower column member 9 are four collet pieces 78 which serve as a joint to be fitted to the connecting end of upper column member 8, collet pieces 78 being arranged in the circumferential direction at intervals and being respectively fitted in catching concavities 10 of lower column member 9. A pin 80 formed on the outer surface of each collet piece 78, about the middle of the length of the collet piece, is caught in each catching hole 81 bored in lower column member 9, thereby securing collet piece 78 at its position. The upper and lower ends of each collet piece 78 are respectively formed into tapered surfaces 82/83, which both incline outward.

Upper-end tapered surfaces 82 of collet pieces 78 are so formed as to be caught by collet catching portions 75 at the bottom of nut 72, and tapered surfaces 83 at the lower end of collet pieces 78 are to be caught by tapered collet catching portions 85 of a collet 84 provided inside lower column member 9, collet catching portions 85 being formed on the outer surface of the upper portion of collet 84 in such a manner that each collet catching portion 85 becomes thicker from the top to bottom. Collet catching portions 85 of collet 84 are formed at four locations which are at some distance from one another in the circumferential direction and respectively correspond to catching concavities 10 of upper column member 8.

A groove 86 is formed about the middle of the inner side of each collet piece 78, and an annular member 87 is fitted in these grooves 78 so that the four collet pieces 78 are securely held between annular member 87 and lower column member 9.

A screw rod 89 having at its tip a threaded portion 88 to be screwed in nut 72 is inserted into lower column member 9 from a through hole 91 of a flange 90 which is provided at the lower end of lower column member 9. A thick portion 92 for catching collet 84 and moving it upward is formed about the middle of screw rod 89. Screw rod 89 is constantly exposed to the force pushing it upward by a coil spring (not shown) coiled around screw rod 89. Further, a knob 93 is attached to the lower end of screw rod 89.

Next, the operation of this embodiment is explained hereunder.

When used in normal circumstances, main body 1 is set at an appropriate position by three leg rods 2. Then, by operating handle 7 to raise or lower center column 3 through engagement of rack teeth 5 of center column 3 with gear 6, a camera is set at the most suitable height to take pictures. When taking pictures from a low angle, turn screw rod 89 with knob 93, thereby unscrewing screw rod 89 from nut 72, and remove lower column member 9 from upper column member 8. When upper column member 8 is lowered in this state, as the length by which upper column member 8 projects down is short, it is possible to set the camera sufficiently low.

In the state where screw rod 89 is unscrewed from nut 72, stopper operator 66 is moved upward by the force of spring 70, and nut 72, with screw rod portion 71 of stopper operator 66 screwed therein, is also moved upward so that collet catching portions 75 of nut 72 become detached from tapered surfaces 82 of collet pieces 78, permitting lower column member 9 to be removed from upper column member 8.

When lower column member 9 is removed from upper column member 8, screw rod 89 is already released from engagement with nut 72. Therefore, stopper operator 66, being pushed by spring 70, slides upward so that raised cam portions 68b at the bottom of its cam surfaces 68 come to contact with operated surfaces 67b of stoppers 64/64, thereby causing stoppers 64/64 to pivot around their respective shaft portions 64a and causing stopper protrusions 65/65 to protrude out of through holes 18 of upper column member 8. When upper column member 8 is moved upward in this state, as stopper protrusions 65/65 are caught by the keys of main body 1, the upward movement of upper column member 8 is restrained, preventing it from accidentally slipping off of main body 1.

When connecting lower column member 9 to upper column member 8, fit collet pieces 78 which serve as joint 22 of lower column member 9 to the connecting end of upper column member 8, with their circumferential positions being set by engaging collet pieces 78 in catching concavities 10 of upper column member 8. In this state, as tapered surfaces 82 of collet pieces 78 respectively face collet catching portions 75 of nut 72 so as to be engaged therewith in taper engagement, upper column member 8 being connected to lower column member 9 with their positions being aligned with respect the axial direction, rack teeth 5 of upper column member 8 are aligned with those of lower column member 9 in a straight line.

Then, securely connect lower column member 9 to upper column member 8 by screwing screw rod 89, which has been inserted through lower column member 9 from its lower end, in nut 72 provided inside upper column member 8. In this state, tapered surfaces 82 of collet pieces 78 are respectively engaged with collet catching portions 75 of nut 72 in taper engagement, and lower taper surfaces 83 of collet pieces 78 are engaged with collet catching portions 85 of collet 84 in taper engagement, said collet 84 having been connected to screw rod 89 and pushed up therewith. At that time, as tapered surfaces 82/83 at the upper and lower ends of each collet piece 78 are respectively clamped with each collet catching portion 75 of nut 72 and collet catching portion 85 of collet 84, it is ensured that upper column member 8 and lower column member 9 are securely joined together, without the danger of rattling at their connecting ends or without deformation force from collet pieces 78 being applied to upper and lower collet catching portion 75/85.

Further, as screw rod 89 is biased by a spring which is not shown in the drawings, it can be easily screwed into nut 72.

When screw rod 89 is screwed into nut 72 provided inside upper column member 8 by connecting lower column member 9 to upper column member 8, nut 72 approaches screw rod 89 to resist the force of spring 70 and slides downward in the axial direction, again resisting spring 70. As a result, raised cam portions 68a of cam surfaces 68 of stopper operator 66 catch operated surfaces 67a of stoppers 64/64, thereby causing stoppers 64/64 to pivot around respective shaft portions 64a, so that stopper protrusions 65/65 of stoppers 64/64 retreat from through holes 18 of upper column member 8. Thus, stopper protrusions 65/65 retreat from key ways 11, and lower column member 9 of center column 3 is moved in the vertical direction without catching the keys of main body 1. As movement of center column 3 is restrained by flange 90 engaged with the keys at the raised position of center column 3 and flange 21 engaged with the keys at the lowered position of center column 3, center column 3 is prevented from slipping off of main body 1.

In the configuration of this embodiment, too, collet pieces 78 are provided at lower column member 9 of center column 3. However, collet pieces 78 may be provided at upper column member 8 so as to be fitted to the connecting end of lower column member 9.

INDUSTRIAL APPLICABILITY

As described above, a tripod according to the invention is suitable for setting a subject mounted on the tripod at a low position.

I claim:

1. A tripod, comprising:

a main body;

a center column attached to said main body;

said center column including an upper column member and a lower column member joined at connecting ends thereof;

said lower column member being removable from said upper column member;

a first plurality of rack teeth on an outer surface of said upper column member;

a second plurality of rack teeth on an outer surface of said lower column member;

a gear rotationally attached to said main body;

said gear engaging said first and second pluralities of rack teeth, whereby rotating said gear vertically moves said upper column member and said lower column member;

said first plurality of rack teeth being axially aligned with said second plurality of rack teeth when said lower column member is attached to said upper column member;

a joint attached to one of said connecting end of said upper column member and said connecting end of said lower column member;

said joint having an irregular shape corresponding to an inner surface of the other of said connecting end of said lower column member and said connecting end of said upper column member;

a sliding nut inside said upper column member;

a screw rod extending axially from a lower end of said lower column member;

said screw rod screwing into said sliding nut inside said upper column member, thereby affixing said lower column member to said upper column member;

at least one key way forming a continuous axial groove along an outer surface of said upper column member and an outer surface of said lower column member;

at least one key on said main body which continuously engages said at least one key way; and means for selectively engaging said at least one key way in said upper column member to prevent said upper column member from slipping off said main body when said lower column member is removed.

2. The tripod according to claim 1, wherein said means for selectively engaging said at least one key way in said upper column member comprises:

at least one through hole in said at least one key way;

a stopper;

at least one elastic stick portion on said stopper;

at least one stopper protrusion on said at least one elastic stick portion for selectively engaging said at least one through hole;

said at least one elastic stick portion having elastic force for retreating said at least one stopper protrusion from said at least one through hole in said at least one key way;

a catching portion on an upper surface of said sliding nut inside said upper column member;

a spring upwardly biasing said sliding nut whereby said catching portion of said sliding nut engages said at least one elastic stick portion of said stopper, forcing said at least one stopper protrusion to obstruct said at least one key way when said lower column member is removed from said upper column member; and said screw rod moving said catching portion of said sliding nut downward when said screw rod is screwed into said sliding nut, disengaging said at least one elastic stick portion of said stopper, thereby retracting said at least one stopper protrusion from said at least one key way when said lower column member is attached to said upper column member.

3. The tripod according to claim 1, further comprising:

a first plurality of collet pieces having tapered upper ends;

a second plurality of collet pieces having tapered lower ends;

said tapered upper ends of said first plurality of collet pieces protruding from an upper end of a joint at a connecting end of said lower column member;

said tapered lower ends of said second plurality of collet pieces extending from a lower end of said joint into said lower column member;

a plurality of tapered collet piece catching portions on a lower surface of said sliding nut inside said upper column member;

a collet located inside said lower column member;

a plurality of tapered collet piece catching portions on an upper surface of said collet;

said collet moving upward, thereby engaging said tapered lower ends of said second plurality of collet pieces when said screw rod screws into said sliding nut; and said sliding nut moving downward, thereby engaging said tapered upper ends of said first plurality of collet pieces when said screw rod screws into said sliding nut.

4. A tripod, comprising:

a main body;

a center column attached to said main body;

said center column including an upper column member and a lower column member joined at connecting ends thereof;

said lower column member being removable from said upper column member;

a first plurality of rack teeth on an outer surface of said upper column member;

a second plurality of rack teeth on an outer surface of said lower column member;

a gear rotationally attached to said main body;

said gear engaging said first and second pluralities of rack teeth, whereby rotating said gear vertically moves said upper column member and said lower column member;

said first plurality of rack teeth being axially aligned with said second plurality of rack teeth when said lower column member is attached to said upper column member;

a joint attaching to said connecting end of said lower column member and having an irregular surface corresponding to an inner surface of said connecting end of said upper column member;

a fixed nut inside said upper column member;

a screw rod extending axially from a lower end of said lower column member;

said screw rod screwing into said fixed nut inside said upper column member, thereby securing said lower column member to said upper column member;

at least one of key way forming a continuous axial groove along an outer surface of said upper column member and an outer surface of said lower column member;

at least one key on said main body which continuously engages said at least one key way; and means for selectively engaging said at least one key way in said upper column member to prevent said upper column member from slipping off said main body when said lower column member is removed.

5. The tripod according to claim 4, wherein said means selectively engaging said at least one key way comprises:

at least one through hole in said at least one key way;

at least one stopper pivotally disposed inside said upper column member;

said at least one stopper including at least one operated surface and at least one stopper protrusion;

a stopper operator having axial mobility;

said stopper operator including a cam concavity which engages and disengages said at least one operated surface of said at least one stopper;

a spring downwardly biasing said stopper operator;

when said lower column member is detached, said spring moving said stopper operator downward, said cam concavity of said stopper operator engaging said at least one operated portion of said at least one stopper, said at least one stopper pivoting, thereby extending said at least one stopper protrusion through said at least one through hole to obstruct said at least one key way;

said stopper operator having operating sticks extending through grooves in said fixed nut; and when said lower column member is attached to said upper column member, said joint attached to said connecting end of said lower column member pushing up on said operating sticks, said stopper operator moving upward, said cam concavity of said stopper operator disengaging said at least one operated portion of said at least one stopper, said at least one stopper pivoting, thereby retracting said at least one stopper protrusion inward from said at least one through hole in said at least one said key way.

6. A tripod, comprising:

a main body;

a center column attached to said main body;

said center column including an upper column member and a lower column member joined at connecting ends thereof;

said lower column member being removable from said upper column member;

a first plurality of rack teeth on an outer surface of said upper column member;

a second plurality of rack teeth on an outer surface of said lower column member;

a gear rotationally attached to said main body;

said gear engaging said first and second pluralities of rack teeth, whereby rotating said gear vertically moves said upper column member and said lower column member;

said first plurality of rack teeth being axially aligned with said second plurality of rack teeth when said lower column member is attached to said upper column member;

at least one key way forming a continuous axial groove along an outer surface of said upper column member and an outer surface of said lower column member;

at least one key on said main body continuously engaging said at least one key way; and means for connecting said lower column member to said upper column member to prevent vibration of said center column during raising and lowering.

7. The tripod according to claim 6, wherein said means for connecting said lower column member to said upper column member to prevent vibration of said center column during raising and lowering comprises:

a plurality of collet pieces attached to at least one of said connecting end of said lower column member and said connecting end of said upper column member;

said plurality of collet pieces including tapered upper ends and tapered lower ends;

a collet inside said lower column member;

said collet having axial mobility;

said collet including tapered collet piece catching portions on an upper surface of said collet;

a sliding nut inside said upper column member;

said sliding nut having axial mobility;

said sliding nut including tapered collet piece catching portions on a lower side of said sliding nut;

a screw rod extending axially through said lower column member;

said screw rod including a thick portion at a lower end of said screw rod;

said screw rod screwing into said sliding nut, pulling said sliding nut downward, thereby causing said tapered collet piece catching portions on said lower side of said sliding nut to engage said tapered upper ends of said plurality of collet pieces;

said thick portion of said screw rod pushing said collet upwards as said screw rod screws into said sliding nut, thereby causing said tapered collet piece catching portions on said upper surface of said collet to engage said tapered lower ends of said plurality of collet pieces; and said screw rod, said collet, said plurality of collet pieces, and said sliding nut forming a secure connection between said upper column member and said lower column member, thereby preventing said center column from vibrating when said center column is raised or lowered.

8. The tripod according to claim 7, further comprising:

means for selectively engaging said at least one key way in said upper column member to prevent said upper column member from slipping off said main body when said lower column member is removed.

9. The tripod according to claim 8, wherein said means for selectively engaging said at least one key way in said upper column member comprises:

at least one through hole in said at least one key way;

at least one stopper pivotally disposed inside said upper column member;

said at least one stopper including at least one upper operated surface and at least one lower operated surface;

said at least one stopper having at least one stopper protrusion;

a stopper operator inside said upper column member;

said stopper operator including at least one upper cam surface and at least one lower cam surface;

a spring upwardly biasing said stopper operator;

said stopper operator attaching to an upper portion of said sliding nut;

when said screw rod unscrews from said sliding nut, said spring pulling said stopper operator upward, said at least one lower cam surface of said stopper operator pushing said at least one lower operated surface of said at least one stopper outward, pivoting said at least one stopper, thereby extending said at least one stopper protrusion through said at least one through hole in said at least one key way; and when said screw rod screws into said sliding nut, said screw rod pulling said sliding nut downward, moving said stopper operator downward, said at least one upper cam surface of said stopper operator pushing said at least one upper operated surface of said at least one stopper outward, pivoting said at least one stopper, thereby retracting said at least one stopper protrusion from said at least one through hole in said at least one key way.

10. A center column for a tripod, comprising:

an upper column member;

a lower column member;

means for connecting said center column to said tripod;

means for raising and lowering said center column;

means for preventing said lower column member from detaching from said tripod when fully raising said center column;

means for connecting and disconnecting said upper and lower column members to each other; and means for preventing said upper column member from detaching from said tripod when fully raising said center column when said upper and lower column members are in a disconnected state.

11. The center column according to claim 10, wherein said means for preventing said upper column member from detaching from said tripod comprises means for limiting upward movement of said upper column member at a predetermined point when said lower column member is detached.

12. The center column according to claim 11, wherein said means for limiting upward movement of said upper column member at a predetermined point when said lower column member is detached comprises at least one stopper protrusion.

13. The center column according to claim 10, wherein said means for connection and disconnecting said upper and lower column members to each other comprises:

means for circumferentially aligning said lower column member with respect to said upper column member; and means for securing said upper and lower column members to each other.

14. The center column according to claim 13, wherein said means for circumferentially aligning said lower column member with respect to said upper column member comprises a joint having an irregular shape.

* * * * *